UNITED STATES PATENT OFFICE.

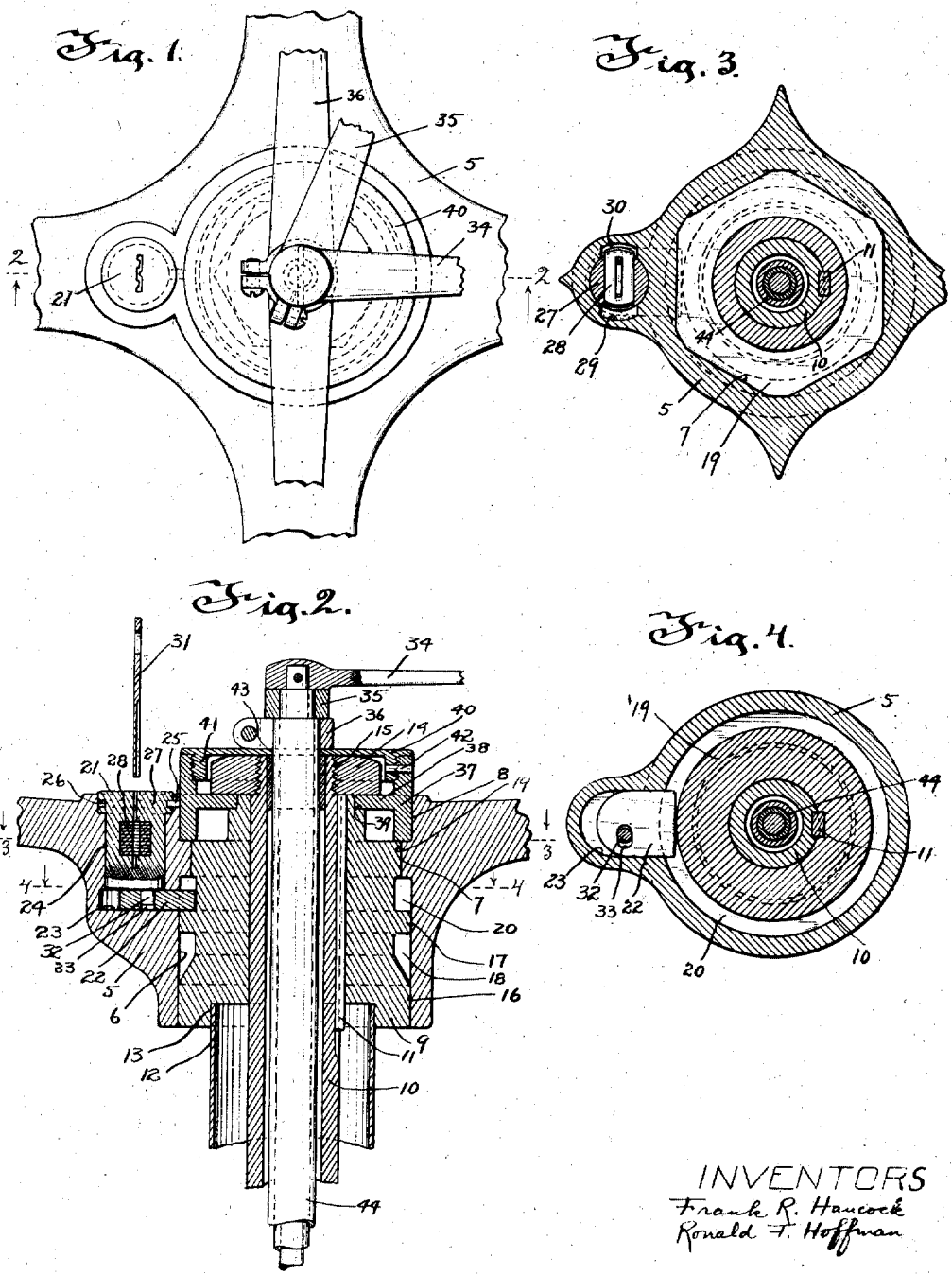

FRANK R. HANCOCK AND RONALD F. HOFFMAN, OF KENOSHA, WISCONSIN.

AUTOMOBILE-LOCK.

1,252,567.　　　Specification of Letters Patent.　　Patented Jan. 8, 1918.

Application filed January 15, 1917. Serial No. 142,442.

*To all whom it may concern:*

Be it known that we, FRANK R. HANCOCK and RONALD F. HOFFMAN, citizens of the United States, and residents of Kenosha, in the county of Kenosha and State of Wisconsin, have invented new and useful Improvements in Automobile-Locks, of which the following is a description, reference being had to the accompanying drawings, which are a part of this specification.

The invention relates to automobile locks.

The invention is more particularly designed to provide a lock for the steering wheel of the automobile to prevent surreptitious removal thereof by providing means for locking the steering wheel in inoperative position.

We are aware that steering wheel locks have been devised in which a polygonal opening in the center of the steering wheel is adapted to be secured to a polygonal nut or projection on the steering post and that said parts may be disengaged and the steering wheel moved with respect to the nut so that a locking bolt carried by the steering wheel may be locked in a groove on the steering post whereby the steering wheel is free to turn upon the post and thus render the automobile uncontrollable and consequently inoperative, but we have found in devices of this kind that it is easy to operate the car in spite of this lock, owing to the fact that a polygonal nut on the steering post is accessible when the wheel is locked in inoperative position, by using an ordinary monkey wrench to engage this polygonal nut and thus operate the steering post to control the machine and it is therefore the object of this invention to overcome the difficulty above pointed out by providing means for preventing access to the formerly accessible steering post nut when the steering wheel is in inoperative position.

The invention further consists in the several features hereinafter set forth and more particularly described by claims at the conclusion hereof.

In the drawings:

Figure 1 is a plan view of the device, parts of the steering wheel being broken away;

Fig. 2 is a section taken on the line 2—2 of Fig. 1;

Fig. 3 is a section taken on the line 3—3 of Fig. 2;

Fig. 4 is a section taken on the line 4—4 of Fig. 2.

Before describing the means for preventing access to the upper nut on the steering post we will describe the other parts of the device with which said means are combined.

In the drawing the numeral 5 designates the spider of a steering wheel of usual construction. This spider is provided with a vertically extending cylindrical bore 6 extending through part of the spider hub, a polygonal opening 7 adjoining the upper portion of the bore 6 and a cylindrical bore 8 adjoining the opening 7, the openings or bores 6 and 8 being co-axial.

This spider at its bored hub portion is adapted to be secured to a locking member 9 which is secured to the steering post 10 by a keyed connection 11. The sliding movement of the member 9 with respect to the post 10 is prevented by disposing said member between the tubular steering post sleeve 12, which fits in a recess 13 in the lower end of the member 9, and a polygonal nut 14 secured in threaded engagement with the upper end 15 of the steering post 10. This member 9 has cylindrical portions 16 and 17 between which is an annular groove 18 and said member also has a polygonal portion 19 between which and the portion 17 is an annular groove 20. The portions 16 and 17 of the member 9 slidably fit within the bore 6 of the hub of the spider and the portion 19 under conditions hereinafter described is adapted to engage with the sides of the polygonal opening 7 of the spider hub or to be disengaged therefrom.

To secure the steering wheel either in operative or inoperative position a lock 21 is set into a portion of the spider hub and is designed to actuate a locking bolt 22 which is slidably mounted in a longitudinal recess 23 in said hub. The lock 21 may be of any suitable construction but we prefer to use a cylindrical tumbler lock, as shown in Figs. 2 and 3, which is set into a vertical recess 24 in the spider hub and secured therein by means of a pin 25 in the spider engaging with an annular groove 26 in the lock cylinder 27, said cylinder being held in locked position by the tumblers 28 which are adapted to be moved into locking recesses 29 and 30 in the spider hub on the withdrawal of the key 31.

With the construction above described when it is desired by the owner to operate the automobile, the steering wheel is moved so that the polygonal portion 19 of the steering post member 9 registers with the polygonal opening 7 in the spider hub of the wheel and under these conditions the key 31 is inserted in the lock 21 and turned so as to move the locking bolt 22, which is operatively connected to the lock cylinder 27 by a pin 32 on said cylinder movably mounted within a slot 33 in said locking bolt, the turning of the key of course causing the turning of the lock cylinder 27 and the insertion of the key moving the tumblers 28 out of locking engagement with the recesses 29 and 30 of the spider hub. Under these conditions the locking bolt 22 is moved inwardly and projects into the annular groove 20 as shown in Fig. 2 and the wheel is thus supported by and connected up to the member 9 so that the turning of the wheel will turn the steering post 10 to which the member is connected. Now if it is desired to render the steering wheel inoperative the locking bolt 22 is moved out of the annular groove 20 on the operation of the lock and the wheel is then moved down with respect to the member 9 so that the hexagonal portion 19 of the member 9 is disengaged from the sides of the opening 7 at which time the locking bolt 22 is disposed adjacent the annular groove 18 and by turning the lock to locking position the bolt 22 moves into the annular groove 18 and thus prevents the locking engagement between the member 9 and the wheel since the portion 17 of the member 9 forms a stop for said bolt and under these conditions the wheel is only free to turn on the steering post.

The gas and spark levers 34 and 35 and the quadrant member 36 are of usual construction and mounted to the steering post above the nut 14, said parts being connected to the parts which they control by the usual tubes which pass through the steering post 10.

It will be noted from the construction thus far described that when the steering wheel is locked in inoperative position the nut 14 will be exposed and it is therefore possible to operate or control the steering post by the use of an ordinary monkey wrench to engage the nut 14 and consequently the device thus far described is not fool proof.

To prevent accessibility to this nut 14 we have devised the following means which are used in combination with the parts previously described.

This means consists of a tubular sleeve 37 slidably fitting within the bore 8 of the spider hub and projecting upwardly from the normal position of the spider 5 to a distance equal to the thickness of the nut 14. This sleeve is provided with an inwardly extending annular flange portion 38 which slidably engages an annular recess 39 at the upper end of the member 9, said flange being disposed between the shouldered portion of the recess 39 and the nut 14. The sleeve 37 extends downwardly into the spider hub the length of the bore 8 and the length of this bore is such so that when the wheel is moved to its inoperative position, as previously described, said sleeve cannot be moved out of engagement with the bore 8.

In connection with this sleeve, we prefer to use a cylindrical cap 40 which has a depending flange portion 41 in threaded engagement with the inner upper portion of said sleeve and said sleeve and cap are further secured together by means of a pin 42 passing through them. The cap 40 is disposed between the top of the nut 14 and the quadrant 36, said cap having an aperture 43 therein through which the housing 44 for the spark and gas controls pass.

Thus the sleeve and cap form a means for completely inclosing the nut and preventing access thereto so that it would be impossible to use a wrench to turn the steering post, though the cap may be omitted in which instance it would also be impossible to turn the steering post without the use of some form of socket wrench which wrench however could not be used because the levers or controls 34 and 35 and the quadrant 36 would prevent its use and if these levers and quadrant were removed the control rods would drop down and it would be practically impossible to replace the levers and the quadrant even if the nut could be turned by a special form of wrench in time to permit surreptitious removal of the automobile and consequently the sleeve itself would practically prevent the removal of the automobile though the sleeve with the cap is the preferred construction because in addition to completely inclosing the nut 14 it excludes dust from the parts of the device.

The invention thus exemplifies a steering wheel lock which is practically fool proof.

We are aware that the details of construction herein shown and described are capable of some change and modification and we therefore wish it understood that such changes as come within the scope of the appended claims are within the spirit of our invention.

What we claim as our invention is:

1. The combination, with a steering post, of a locking member secured thereto, a steering wheel having its hub portion mounted on said locking member, locking means for securing said wheel to said locking member to cause said member to turn with said wheel, and for securing said wheel in inoperative position on said locking member, a nut at the upper end of the post for securing said locking member thereto against vertical movement, and freely revoluble means for preventing access to said nut.

2. The combination, with a steering post, of a locking member secured thereto, a steering wheel having its hub portion mounted on said locking member, locking means for securing said wheel in operative and inoperative position with respect to said locking member, a nut at the upper end of the post for securing said locking member against removal and freely revoluble means for preventing access to said nut.

3. The combination, with a steering post, of a locking member secured thereto, a steering wheel having its hub portion mounted on said locking member, means for securing said wheel in operative and inoperative position with respect to said locking member, a nut at the upper end of the post for securing said locking member against removal, and a freely revoluble sleeve surrounding said nut to prevent access thereto.

4. The combination, with a steering post, of a locking member secured thereto, a steering wheel having its hub portion mounted on said locking member, means for securing said wheel in operative and inoperative position with respect to said locking member, a nut at the upper end of the post for securing said locking member against removal, and a freely revoluble sleeve and cap inclosing said nut to prevent access thereto.

5. The combination, with a steering post, of a locking member non-rotatably secured thereto, a steering wheel having its hub portion mounted on said member, means for securing said wheel in operative and inoperative position with respect to said locking member, a nut at the upper end of the post for securing said locking member against vertical movement, and a cylindrical hood freely revolubly mounted on said locking member and inclosing said nut to prevent access thereto.

In testimony whereof we affix our signatures.

FRANK R. HANCOCK.
RONALD F. HOFFMAN.